US012639939B2

(12) United States Patent　　　　(10) Patent No.:　US 12,639,939 B2
Venkataramanan et al.　　　　　　　(45) Date of Patent:　May 26, 2026

(54) INCREMENTAL LEARNING FOR ANOMALY DETECTION AND LOCALIZATION IN IMAGES

(71) Applicant: Siemens Aktiengesellschaft, Munich (DE)

(72) Inventors: Shashanka Venkataramanan, Orlando, FL (US); Rajat Vikram Singh, Santa Clara, CA (US); Kuan-Chuan Peng, Boston, MA (US)

(73) Assignee: Siemens Aktiengesellschaft, Munich (DE)

( * ) Notice: Subject to any disclaimer, the term of this patent is extended or adjusted under 35 U.S.C. 154(b) by 567 days.

(21) Appl. No.: 18/043,383

(22) PCT Filed: Aug. 28, 2020

(86) PCT No.: PCT/US2020/048454
§ 371 (c)(1),
(2) Date: Feb. 28, 2023

(87) PCT Pub. No.: WO2022/046077
PCT Pub. Date: Mar. 3, 2022

(65) Prior Publication Data
US 2023/0326195 A1　　　Oct. 12, 2023

(51) Int. Cl.
*G06V 10/82*　　　(2022.01)
*G06V 10/25*　　　(2022.01)
*G06V 20/40*　　　(2022.01)

(52) U.S. Cl.
CPC ............. *G06V 10/82* (2022.01); *G06V 10/25* (2022.01); *G06V 20/44* (2022.01)

(58) Field of Classification Search
CPC ........ G06V 10/25; G06V 10/82; G06V 20/44; G06N 3/045; G06F 18/214
See application file for complete search history.

(56) References Cited

U.S. PATENT DOCUMENTS

| 11,429,868 | B2 * | 8/2022 | Beggel | G06N 3/0455 |
| 2022/0004803 | A1 * | 1/2022 | Li | G06T 19/006 |
| 2022/0344049 | A1 * | 10/2022 | Hall | G06F 9/5066 |

FOREIGN PATENT DOCUMENTS

| CN | 108830827 | A | 11/2018 |
| CN | 110458060 | A | 11/2019 |
| CN | 110580470 | A | 12/2019 |

(Continued)

OTHER PUBLICATIONS

Zhang, Zhiwei et al: "P-KDGAN: Progressive Knowledge Distillation with GANs for One-class Novelty Detection"; arxiv.org; Cornell University Library; 201 Olin Library Cornell University Ithaca, NY 14853; Jul. 14, 2020; pp. 1-7; XP081722455.

(Continued)

*Primary Examiner* — Daniel G Mariam

(57) ABSTRACT

Anomalies in multiple different scenes or images can be detected and localized in a single training flow of a neural network. In various examples, incremental learning can be applied to a given system or network, such that the system or network can learn the distribution of new scenes in a single training flow. Thus, in some cases, when an anomalous image from a new scene is given as input to the network, the network can detect and localize the anomaly.

13 Claims, 4 Drawing Sheets

RECEIVE A PLURALITY OF INPUT IMAGES THAT EACH INCLUDE SCENES THAT APPEAR AS EXPECTED 302

↓

TRAIN THE FIRST NEURAL NETWORK SYSTEM ON THE PLURALITY OF NON-ANOMALOUS IMAGES 304

↓

TRANSFER INFORMATION ASSOCIATED WITH THE PLURALITY OF NON-ANOMALOUS IMAGES TO A SECOND NEURAL NETWORK SYSTEM 306

↓

RECEIVE AN INPUT IMAGE THAT INCLUDES A SCENE THAT INCLUDES AN ANOMALY SO AS TO NOT APPEAR AS EXPECTED 308

↓

BASED ON THE INFORMATION ASSOCIATED WITH THE PLURALITY OF NON-ANOMALOUS IMAGES, DETECT THE ANOMALY OF THE ANOMALOUS IMAGE 310

(56)　　　　　　　　References Cited

FOREIGN PATENT DOCUMENTS

| | | | |
|---|---|---|---|
| CN | 117934425 | A | 4/2024 |
| EP | 3633990 | A1 | 4/2020 |
| WO | 2018170401 | A1 | 9/2018 |
| WO | 2019180310 | A1 | 9/2019 |

OTHER PUBLICATIONS

Bergmann Paul et al: "Uninformed Students: Student-Teacher Anomaly Detection With Discriminative Latent Embeddings"; 2020 IEEE/CVF Conference on Computer Vision and Pattern Recognition (CVPR); IEEE; Jun. 13, 2020; pp. 4182-4191; XP033803683; DOI: 10.1109/CVPR42600.2020.00424.

Tang, Ta-Wei et al: "Anomaly Detection Neural Network with Dual Auto-Encoders GAN and Its Industrial Inspection Applications"; Sensors; vol. 20; No. 3336; Jun. 12, 2020; pp. 1-11; XP055800823; DOI: 10.3390/s20123336.

* cited by examiner

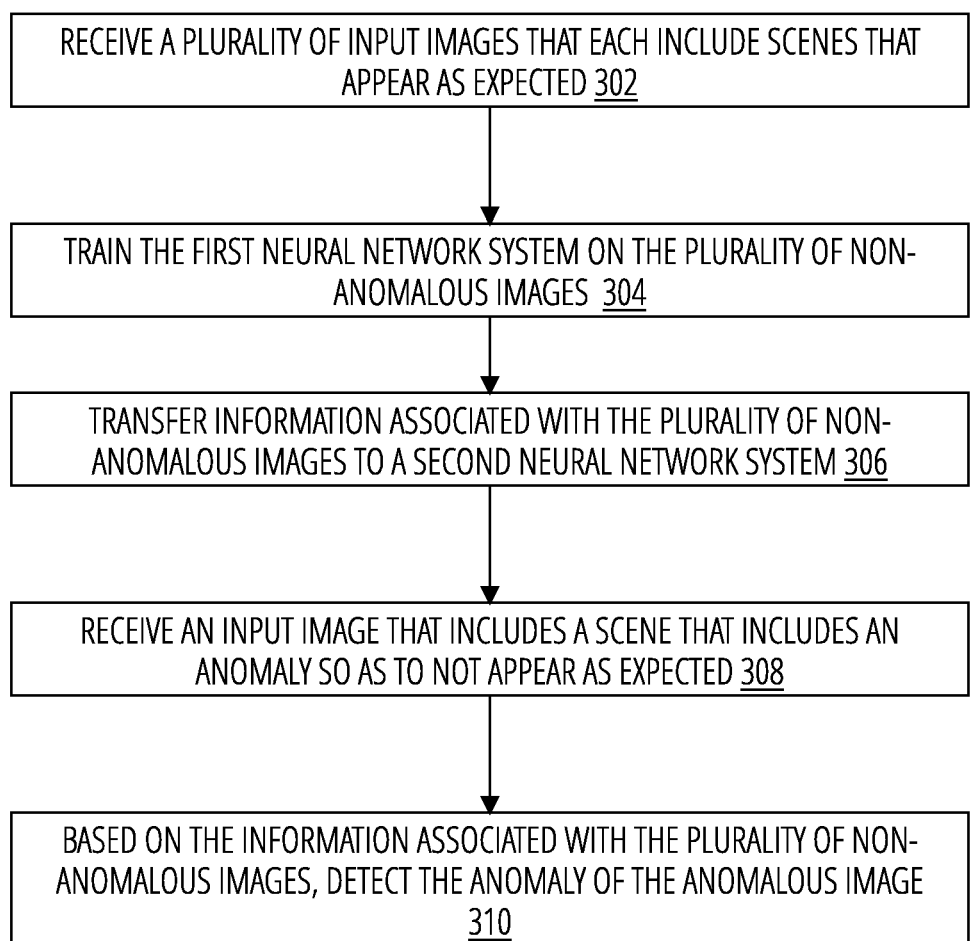

RECEIVE A PLURALITY OF INPUT IMAGES THAT EACH INCLUDE SCENES THAT APPEAR AS EXPECTED 302

TRAIN THE FIRST NEURAL NETWORK SYSTEM ON THE PLURALITY OF NON-ANOMALOUS IMAGES 304

TRANSFER INFORMATION ASSOCIATED WITH THE PLURALITY OF NON-ANOMALOUS IMAGES TO A SECOND NEURAL NETWORK SYSTEM 306

RECEIVE AN INPUT IMAGE THAT INCLUDES A SCENE THAT INCLUDES AN ANOMALY SO AS TO NOT APPEAR AS EXPECTED 308

BASED ON THE INFORMATION ASSOCIATED WITH THE PLURALITY OF NON-ANOMALOUS IMAGES, DETECT THE ANOMALY OF THE ANOMALOUS IMAGE 310

FIG. 3

INCREMENTAL LEARNING FOR ANOMALY DETECTION AND LOCALIZATION IN IMAGES

BACKGROUND

An anomaly can generally be defined as an event or occurrence that does not follow expected or normal behavior. In the context of neural networks or machine learning, an anomaly can be difficult to define, but the definition can be critical to the success and effectiveness of a given anomaly detector. An efficient anomaly detector should be capable of differentiating between anomalous and normal instances with high precision, so as to avoid false alarms. With respect to identifying anomalies in images or scenes, it can be impractical or, in some cases, infeasible using existing approaches, to train a neural network to identify anomalies of different types that can occur in all sorts of scenes. Thus, current neural network approaches to identifying anomalies lack capabilities in terms of efficiency and accuracy, among others

BRIEF SUMMARY

Embodiments of the invention address and overcome one or more of the described-herein shortcomings by providing methods, systems, and apparatuses that improve anomaly detection. For example, in various embodiments, anomalies in multiple different scenes or images can be detected and localized in a single training flow of a neural network. In various examples, incremental learning can be applied to a given system or network, such that the system or network can learn the distribution of new scenes in a single training flow. Thus, in some cases, when an anomalous image from a new scene is given as input to the network, the network can detect and localize the anomaly.

In an example aspect, a system can include a first neural network system and a second neural network system. A first encoder module of the first neural network system can receive a plurality of input images that each include scenes that appear as expected, such that the plurality of input images defines a plurality of non-anomalous images. The first neural network system can be trained on the plurality of non-anomalous images so as to learn information associated with the plurality of non-anomalous images. The first neural network system can transfer information associated with the plurality of non-anomalous images to the second neural network system, for instance using knowledge distillation loss, such that the first neural network system defines a teacher model, and the second neural network system defines a student model. After training the first neural network system, a second encoder module of the second neural network system can receive a given input image that includes a scene that includes an anomaly so as to not appear as expected, such that the input image defines an anomalous image. Based on the information associated with the plurality of non-anomalous images, the system can detect the anomaly of the anomalous image. In some cases, based on the information associated with the plurality of non-anomalous images, the system can determine a region of the anomalous image that corresponds to the anomaly, so as to localize the anomaly.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 is a flow diagram that depicts a method that can be performed by the system of FIG. 2, in accordance with an example embodiment.

DETAILED DESCRIPTION

In various embodiments, anomalies in multiple different scenes or images can be detected and localized in a single training flow of a neural network. In various examples, incremental learning can be applied to a given system or network, such that the system or network can learn the distribution of new scenes in a single training flow. System and network can be used interchangeably herein without limitation, unless otherwise specified. Because of the training described herein, in some cases, when an anomalous image from a new scene is given as input to the network, the network can detect and localize the anomaly. To do so, as described herein, the network can be trained on non-anomalous images using unsupervised learning.

Figure 1:
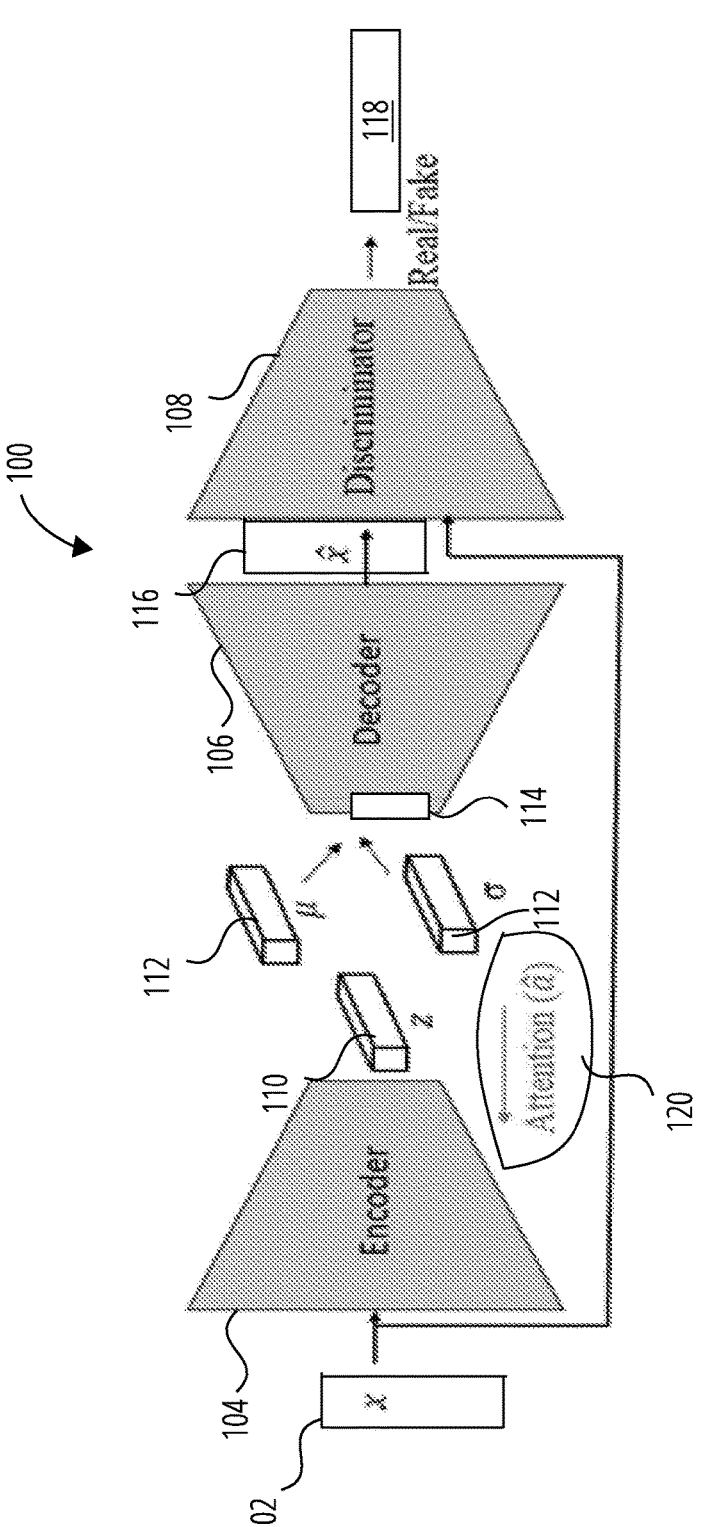
FIG. 1 is a block diagram of an example neural network model according to an example embodiment.

In particular, referring to FIG. 1, a system or network 100 can be trained on a plurality of input images 102. The input images 102 can define respective scenes, for instance industrial scenes that include one or more machines or components, or medical scenes that include medical devices or bodily structures. It will be understood that that the input images are not limited to the examples described herein. That is, the input images 102 can vary as desired, and all such input images are contemplated as being within the scope of this disclosure. Further, in various examples, the input images 102 can define a vectorized input, RGB image, CAD image, or the like. The input images 102 can include images that are captured by various sensors or camera, and all such captured images are contemplated as being within the scope of this disclosure. By way of example, a given input image 102 of a given machine can be captured by a camera positioned to capture images of all or part of the machine. As described further herein, in accordance with various embodiments the system 100 can be trained on input images 102 that are non-anomalous images. Generally non-anomalous images are images that define a scene that is ordinary, or is consistent with an expectation for the scene. By way of example, a non-anomalous image of a particular machine, such as a turbine or computer numerical control (CNC) machine, might depict the machine in its normal operating state that is consistent with its design. Continuing with the example, an anomalous image of the same machine might depict a tool that was left in the machine, or an additional or damaged component of the machine. In an example, a set of non-anomalous images is defined, and then images that depict a scenario that is not covered in the set of non-anomalous images can be considered to be anomalous images.

With continuing reference to FIG. 1, the network 100 can define an adversarial variational autoencoder (AVAE) system, for instance a convolutional AVAE. The network 100 can include an encoder convolutional network or module 104, a decoder convolutional network or module 106, and a discriminator convolutional network or module 108. Thus, each of the encoder module 104, decoder module 106, and discriminator module 108 can include a plurality of layers. Layers of the encoder module 104, decoder module 106, and discriminator module 108 can be fully connected or convolutional. Fully connected layers may include neurons that communicate their respective output to every neuron in an adjacent layer. In contrast to the fully connected layers, the convolutional layers may be locally connected, such that, for example, the neurons in a given layer might be connected to a limited number of neurons in an adjacent layer. The convolutional layers can also be configured to share connection strengths associated with the strength of each neuron. It will be understood that the network 100 is simplified for purposes of example. For example, the network 100 may include any number of layers as desired, in particular any number of intermediate layers, and all such models are contemplated as being within the scope of this disclosure.

The encoder module 104, in particular an input layer of the encoder module 104, can receive the input images 102. The encoder module 104 can process the input images 102 to generate encoder outputs 110. In particular, a given encoder output 110, which can also be referred to as z, can represent its corresponding input image 102, which can also be referred to as x, in the latent space. For example, the encoder module 104 can include a neural network that receives an input image (or datapoint x), and outputs its hidden (latent) representation z. In particular, a given input image 102 can define a first number of dimensions, and the encoder module 104 can encode the data of the input image 102 into the encoder output 110 (or latent representation space z) that defines a second number of dimensions that is less than the first number of dimensions. Thus, the encoder module 104 can learn an efficient compression of the data of the input images 102 into the lower dimensional space of the data of the encoder output 110. The encoder output 110 defines a data distribution that can be characterized by parameters 112, in particular a mean $\mu$ and standard deviation $\sigma$. Using the parameters 112, the latent activations can be sampled so as to define a decoder input 114. Using the decoder input 114 that is based on the latent space z or encoder output 110, the decoder module 106 can reconstruct the input images 102 so as to generate corresponding reconstructed images 116, which can be referred to as z. The discriminator module 108 can receive the input images 102 and the reconstructed images 116 as input, and can compare the respective data distributions of the input images 102 and reconstructed images, so as to make a determination or prediction, or to generate a label such as related to whether the input x is real or fake. Thus, a discriminator output 118 can indicate whether the corresponding input to the system 100 is real or fake. A goal during training of the system 100 is to make the reconstructed images 116 sharper and more accurate as compared to the corresponding input images 102. To do so, an attention map 120, which can be referred to as â can be normalized $\in (0, 1)$, can be computed by backpropagating the gradients from the encoder output 110 (z).

With respect to attention maps, it is recognized herein that state-of-the-art deep learning based classifiers typically generate the attention map by backpropagating the gradients corresponding to a specific class to the input image. In various embodiments the input images 102 are unlabeled, and thus activation maps can be obtained from the latent space z. The activation maps can be used to generate the attention maps. In various examples, the generated attention maps indicate or describe regions of the input images 102 that are discriminative. Discriminative regions can refer to regions on which the ultimate label or classification of the discriminator output 118 is based. In an example, Grad-CAM can be used to compute the attention map 120 using gradient backpropagation.

With respect to training the system 100, in accordance with some embodiments, the system 100 is trained only on non-anomalous images. Thus, during training, the input images 102 are non-anomalous such that, during inference time, or when the system 100 is used to make a prediction or generate a classification, the input images 102 can include anomalous images, and the system will not reconstruct regions of the anomalous images that pertain to the anomaly. The network or system 100 trained and used in this manner can define a teacher model 202, which is described further herein with reference to FIG. 2. In particular, the discriminator module 108 can compute a pixel-wise difference between a given reconstructed image 116 and its corresponding anomalous input image 102. Based on the pixel-wise difference, the discriminator module 108, and thus the network 100, can generate a class score in the discriminator output 118. Thus, the score can represent the pixel-wise difference between an input image and a reconstructed image that corresponds to the input image. Generally, in some cases, the score is higher as the reconstruction is less accurate. A high score can indicate that the input image comes from a different distribution than the non-anomalous image, such that input image can be considered to be anomalous. In an example, when the class score (or pixel-wise difference) associated with an input image is greater than a predetermined or pre-specified threshold, the input image can be defined as anomalous. Similarly, when the class score (or pixel-wise difference) associated with an input image is less than a predetermined or pre-specified threshold, the input image can be defined as non-anomalous. The predetermined threshold can vary in accordance with, or be based on, the use case of the particular operation.

In some cases, training data is limited, such as, for example, when training on images of industrial machines. Further, anomalous data (images) can be difficult or expensive to collect. Thus, in various examples, the network 100 is trained on a limited amount of non-anomalous images so to supplement that training, the network 100 can be pre-trained, for example on ImageNet. In an example, the encoder module 104 can then be fine-tuned on original data or non-autonomous images. Such original data can include images with a large amount of high frequency components, such that decoder module 106 can be configured to employ skip connections and an inter-leaved convolutional layer to preserve local information. The discriminator module 108 positioned at the output of the decoder module 106 can maintain the distribution of the input images 102 and reconstructed images 116, hereby enabling a sharper reconstruction. To preserve the spatial relation, the system 100 can define an AVAE that is end-to-end convolutional.

As described further, the network 100 can be configured as a teacher model 202 or student model 204. In particular, a system or network 200 can include multiple networks 100 arranged such that one network 100 defines the teacher model 202, and one network defines the student model 204. Thus, as described herein, the system 200 can define a student-teacher model capable of learning the distributions of new sets of scenes or images, while retaining previous scenes or images without increasing the network's memory footprint.

In an example, the system 200 can localize an anomaly of one of the input images 102 without any prior information as to where or what the anomaly is. By way of example, a given input image 102 might define a scene that includes a particular machine, such as a turbine or CNC machine. The given input image 102 might further define an anomaly. By way of example, a tool left inside of the particular machine can be included in the given input image 102, so as to define the anomaly. In various examples, the system 200 is trained on only non-anomalous images, and can localize the anomaly of an anomalous image based on that training. In some cases, the training might not include an image of the particular machine, such that the system 200 can identify an anomaly of a scene in which it has not been trained. In particular, in some cases, attention maps of the encoder output 110 can define the latent space attention by using GradCAM, which is a gradient-based class activation map generation mechanism. In various examples, because the latent space corresponds to the distribution of non-anomalous images, the resulting attention maps that are generated can be considered to be the non-anomalous attention map. The areas of attention in an attention map 120 can be maximized, so as to encourage the network 100 to attend to the entire image because the training, in some cases, might involve only non-anomalous images. To maximize the attention, extra supervision can be provided to the network 100 to better attend to the non-anomalous regions of the image. In particular, for example, the attention map, which can be normalized from 0 to 1, can be compared and tuned to a target attention map having all 1's, thereby providing extra supervision by encouraging attention to attend to the entire image. During testing of the system 200, given an anomalous image (an image having an anomaly) as an input image 102, the attention map 120 that is generated can indicate or highlight the non-anomalous regions of the image, such that inverting the attention map 120 can results in an inverted attention map that indicates or highlights the abnormal region of the image. That is, the inverted attention map can indicate the one or more anomalous regions of the image, thereby localizing the anomaly. In some cases, the attention map of the normal class is calculated and inverted, so as to generate the attention map that highlights the anomaly of an anomalous image. The inversion can be generated by subtracting the normalized attention map from an image (e.g., 2D matrix) that defines all 1's.

Further, the input images 102 with which the system 200 is trained can each define respective scenes that are different from each other. Thus, the network 200 can be trained to detect and localize anomalies in a single training flow, rather than training the network 200 on each scene individually. In various examples, to facilitate the learning of a new scene that was not previously defined in the input images 102, the student model 204 can acquire information (e.g., a scene that was previously defined in the input images 102) from the teacher model 202, so as to learn the distribution of non-anomalous images of a new scene without losing information of the previous scene which it acquires from the teacher model 202. Thus, the system 200, in particular the student model 204, can retain the information of the non-anomalous distribution of a previous (old) scene, while the teacher model 202 learns information of a new scene, in a single training flow.

Figure 2:
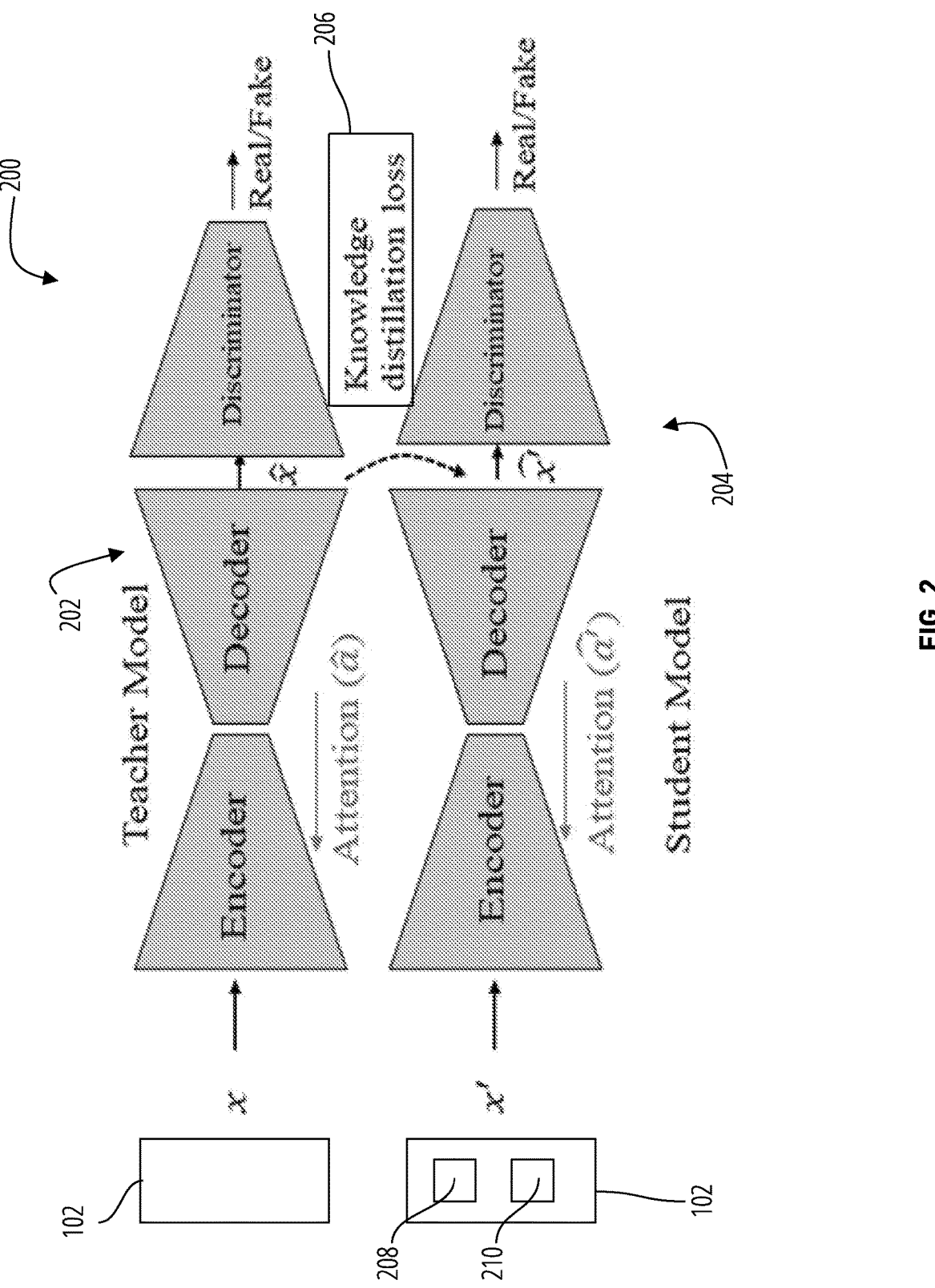
FIG. 2 is a block diagram of a system that includes the neural network model shown in FIG. 1, wherein one neural network model is configured as a teacher model, and one neural network model is configured as a student model, in accordance with an example embodiment.

In another example aspect, with continuing reference to FIG. 2, during training, a knowledge distillation loss 206 can be shared, for instance shared by the teacher model 202 to the student model 204, so as to enable the student model 204 to retain information from previous input images or scenes (or classes) while learning an input image 102 that includes a new scene 208. Thus, the system 200 can be trained so as to learn the distribution of a new set of scenes in a single training flow. In particular, the student model 204 and the teacher model 202 can define or have the same model parameters as each other. In various examples, the student model 204 learns information associated with previously learned scenes from the teacher model 202. In addition, the student model 204 can learn the non-anomalous distribution of a new scene while retaining the information associated with the previously learned scenes acquired from the teacher model 202. In some cases, a memory footprint of the system 200 does not grow with respect to the number of classes (or number of scenes) that the system 200 encounters. The learned information from the teacher model 202 of a previous scene can be transferred to the student model 204 with the help of knowledge distillation loss 206. For example, the student model 204 can be trained with the knowledge distillation loss 206 and the same objective function in which the teacher model 202 is trained, so as to define a trained student model. The knowledge distillation loss can refer to modifications of the cross-entropy loss that can encourage the raw outputs of the student networks to be similar to the raw outputs of the teacher network. Training with this distillation loss can transfer the knowledge learned in the teacher network 202 to the student network 204. After that training, given another new scene 210 defined by another new input image 102, the trained student model can become the teacher model 202, and an untrained network 100 can define the student model 204. Thus, the untrained student model 204 can learn the information from the other new scene 210 with (while learning) the previously learned information. Consequently, during inference time, given an anomalous image from any class, the student model 204 can detect and localizing the anomaly included in the anomalous image.

With continuing reference to FIG. 2, in an example, x can represent the input image of a scene, and x' can represent the input image a new scene. The input image x can be input into the encoder module 104 of the teacher model 202, and the input image x' can be input into the encoder module 104 of the student model 204. In response to the respective inputs, the decoder module 106 of the teacher model can generate the reconstructed image x̂, and the decoder module 106 of the student model 204 can generate the reconstructed image x̂'. The discriminator module 108 of each model can define a respective convolution network that can determine whether the reconstructed images x hat and x̂' defines the same distribution as that of the input images x and z, respectively. Based on the determination of the discriminator module 108, the discriminator output can indicate a class score, or can indicate whether the respective input is real or fake, for example, thereby resulting in a Real/Fake decision as output. In various examples, a goal is to make the reconstruction sharper. The teacher model 202 can compute an attention map â and the student model 204 can compute an attention map â'. The attention maps can be by backpropagating the gradients from the latent space. The knowledge distillation loss 206 can represent the transfer of information of the previous (old) scene on which the teacher network was trained (e.g., the scene from image x), to the untrained student network. In various examples, the student network 204 retains the information of the previous scene (e.g., from image x) along with learning information from the new scene (e.g., from image x').

Referring now to FIG. 3, example operations 300 are shown that can be performed by the system 200, which can include a first neural network system 100 and a second neural network system 100. At 302, a first encoder module of the first neural network system can receive a plurality of input images that each include scenes that appear as expected, such that the plurality of input images defines a plurality of non-anomalous images. At 304, the first neural network system can be trained on the plurality of non-anomalous images so as to learn information associated with the plurality of non-anomalous images. In some examples, training the first neural network system can include computing, by the first encoder module, a latent space representation of each of the plurality of non-anomalous images. Based on the respective latent space representation, the first neural network system can generate an attention map that indicates one or more discriminative regions of the respective non-anomalous image. Further data associated with the attention map can be back-propagated through the first encoder module, for instance toward an input layer of the encoder module 104.

Still referring to FIG. 3, the first neural network system can transfer information associated with the plurality of non-anomalous images to the second neural network system, such that the first neural network system defines a teacher model (e.g., teacher model 202), and the second neural network system defines a student model (e.g., student model 204). In some examples, transferring the information associated with the plurality of non-anomalous images to the second neural network system can include computing, by a decoder module of the first neural network system, a knowledge distillation loss. Further, the knowledge distillation loss can be transferred to the second neural network system.

At 308, for instance after training the first neural network system, a second encoder module of the second neural network system can receive a given input image that includes a scene that includes an anomaly so as to not appear as expected, such that the input image defines an anomalous image. By way of example, and without limitation, the scenes defined by the plurality of non-anomalous images might include a plurality of industrial machines, and the scene defined by the anomalous image might include a machine different from the plurality of industrial machines. By way of further example, the scene defined by the anomalous image might further include a tool within the machine.

With continuing reference to FIG. 3, at 310, based on the information associated with the plurality of non-anomalous images, the system 200 can detect the anomaly of the anomalous image. In some cases, based on the information associated with the plurality of non-anomalous images, the system can determine a region of the anomalous image that corresponds to the anomaly, so as to localize the anomaly. In particular, for example, the first encoder module can compute a latent space representation of each of the plurality of non-anomalous images. Based on the respective latent space representation of each of the plurality of non-anomalous images, a first decoder module of the first neural network system, can reconstruct the plurality of non-anomalous images. The second encoder module can compute a latent space representation of the anomalous image. Based on the latent representation of the anomalous image, a second decoder module of the second neural network system can reconstruct regions of the anomalous image other than the region that corresponds to the anomaly. Additionally, or alternatively, based on the latent space representation of the anomalous image, the second neural network can generate an attention map that indicates one or more discriminative regions of the anomalous image, and the second neural network can invert the attention map so as to localize the anomaly of the anomalous image.

Thereafter, by way of further example, information associated with the plurality of non-anomalous images and the anomalous image can be transferred to a third neural network system, such that the second neural network system defines the teacher model, and the third neural network system defines the student model. Thus, a third encoder module of the third neural network system can receive another input image that includes another scene that includes another anomaly so as to not appear as expected, such that the other input image defines another anomalous image. Based on the information associated with the plurality of non-anomalous images and the anomalous image, the third neural network system can detect the other anomaly of the other anomalous image. This process can continue as many times as desired so as define incremental learning, wherein during each iteration or increment the student model becomes the teacher model, and a new untrained network becomes the student model Consequently, the system 200 can be trained to detect and localize anomalies, based on non-anomalous images, in a single training flow.

Figure 4:
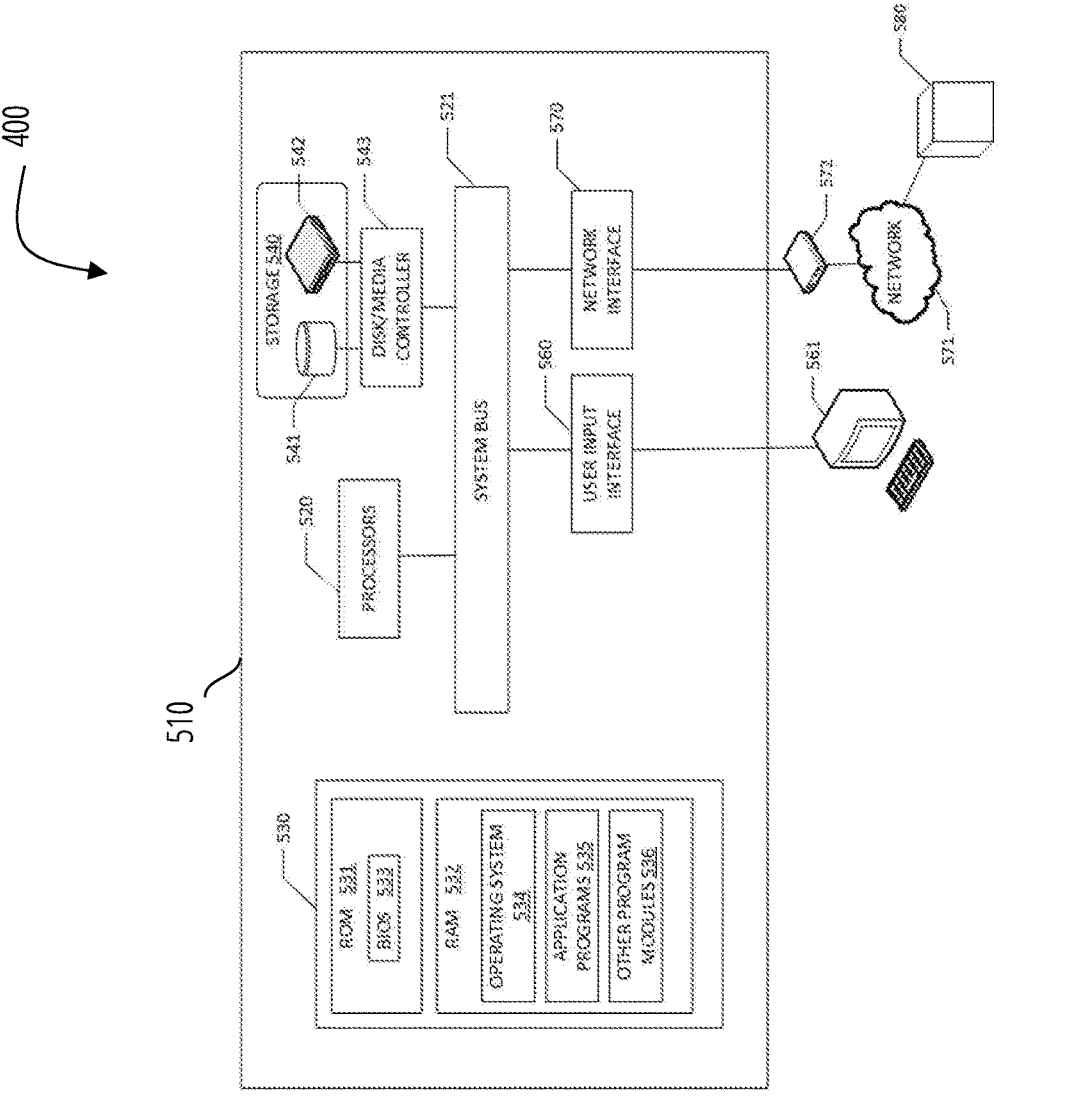
FIG. 4 illustrates a computing environment within which embodiments of the disclosure may be implemented.

FIG. 4 illustrates an example of a computing environment within which embodiments of the present disclosure may be implemented. A computing environment 400 includes a computer system 510 that may include a communication mechanism such as a system bus 521 or other communication mechanism for communicating information within the computer system 510. The computer system 510 further includes one or more processors 520 coupled with the system bus 521 for processing the information. The system 200 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hardwired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 400 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 4 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by a first encoder module of a first neural network system, a plurality of input images that each include scenes that appear as expected, such that the plurality of input images defines a plurality of non-anomalous images;
   training the first neural network system on the plurality of non-anomalous images so as to learn information associated with the plurality of non-anomalous images;
   transferring information associated with the plurality of non-anomalous images to a second neural network system, such that the first neural network system defines a teacher model, and the second neural network system defines a student model;
   receiving, by a second encoder module of the second neural network system, an input image that includes a scene that includes an anomaly so as to not appear as expected, such that the input image defines an anomalous image; and
   based on the information associated with the plurality of non-anomalous images, detecting the anomaly of the anomalous image, wherein training the first neural network system further comprises:
      computing, by the first encoder module, a latent space representation of each of the plurality of non-anomalous images;
      generating, based on the respective latent space representation, an attention map that indicates one or more discriminative regions of the respective non-anomalous image; and
      back-propagating data associated with the attention map through the first encoder module.

2. The method of claim 1, the method further comprising:
   based on the information associated with the plurality of non-anomalous images, determining a region of the anomalous image that corresponds to the anomaly, so as to localize the anomaly.

3. The method of claim 2, the method further comprising:
   computing, by the first encoder module, a latent space representation of each of the plurality of non-anomalous images; and
   based on the respective latent space representation of each of the plurality of non-anomalous images, reconstructing, by a first decoder module of the first neural network system, the plurality of non-anomalous images.

4. The method further of claim 3, the method further comprising:
   computing, by the second encoder module, a latent space representation of the anomalous image; and
   based on the latent representation of the anomalous image, reconstructing, by a second decoder module of the second neural network system, regions of the anomalous image other than the region that corresponds to the anomaly.

5. The method of claim 2, wherein determining the region of the anomalous image further comprises:
   computing, by the second encoder module, a latent space representation of the anomalous image;
   based on the latent space representation of the anomalous image, generating an attention map that indicates one or more discriminative regions of the anomalous image; and
   inverting the attention map so as to localize the anomaly of the anomalous image.

6. The method of claim 1, wherein the scenes defined by the plurality of non-anomalous images include a plurality of industrial machines, and the scene defined by the anomalous image includes a machine different from the plurality of industrial machines.

7. The method of claim 6, wherein the scene defined by the anomalous image further includes a tool within the machine.

8. The method of claim 1, wherein transferring the information associated with the plurality of non-anomalous images to the second neural network system further comprises:

computing, by a decoder module of the first neural network system, a knowledge distillation loss; and transferring the knowledge distillation loss to the second neural network system.

9. The method of claim 1, the method further comprising:

transferring information associated with the plurality of non-anomalous images and the anomalous image to a third neural network system, such that the second neural network system defines the teacher model, and the third neural network system defines the student model;

receiving, by a third encoder module of the third neural network system, another input image that includes another scene that includes another anomaly so as to not appear as expected, such that the other input image defines another anomalous image; and based on the information associated with the plurality of non-anomalous images and the anomalous image, detecting the other anomaly of the other anomalous image.

10. A system comprising a first and second neural network system, the system further comprising:

a processor; and a memory storing instructions that, when executed by the processor, configure the system to:

receive, by a first encoder module of the first neural network system, a plurality of input images that each include scenes that appear as expected, such that the plurality of input images define a plurality of non-anomalous images;

train the first neural network system on the plurality of non-anomalous images so as to learn information associated with the plurality of non-anomalous images;

transfer information associated with the plurality of non-anomalous images to the second neural network system, such that the first neural network system defines a teacher model, and the second neural network system defines a student model;

receive, by a second encoder module of the second neural network system, an input image that includes a scene that includes an anomaly so as to not appear as expected, such that the input image defines an anomalous image;

based on the information associated with the plurality of non-anomalous images, detect the anomaly of the anomalous image;

compute, by the first encoder module, a latent space representation of each of the plurality of non-anomalous images;

generate, based on the respective latent space representation, an attention map that indicates one or more discriminative regions of the respective non-anomalous image; and back-propagate data associated with the attention map through the first encoder module.

11. The system of claim 10, the memory further storing instructions that, when executed by the processor, further configure the system to:

based on the information associated with the plurality of non-anomalous images, determine a region of the anomalous image that corresponds to the anomaly, so as to localize the anomaly.

12. The system of claim 11, the memory further storing instructions that, when executed by the processor, further configure the system to:

compute, by the first encoder module, a latent space representation of each of the plurality of non-anomalous images; and based on the respective latent space representation of each of the plurality of non-anomalous images, reconstruct, by a first decoder module of the first neural network system, the plurality of non-anomalous images.

13. The system of claim 12, the memory further storing instructions that, when executed by the processor, further configure the system to:

compute, by the second encoder module, a latent space representation of the anomalous image; and based on the latent representation of the anomalous image, reconstruct, by a second decoder module of the second neural network system, regions of the anomalous image other than the region that corresponds to the anomaly.

* * * * *